July 16, 1946.  J. A. FINK  2,404,224
POT AND PAN LIFTER AND HOLDER
Filed March 10, 1945

INVENTOR.
Joseph A. Fink
BY Henry J. E. Metzler
Agt.

Patented July 16, 1946

2,404,224

UNITED STATES PATENT OFFICE 2,404,224

POT AND PAN LIFTER AND HOLDER

Joseph A. Fink, Englewood, N. J.

Application March 10, 1945, Serial No. 582,066

2 Claims. (Cl. 294—28)

This invention relates to pot and pan lifters and holders and has for its prime object to provide a device of this character whereby a hot pan may be removed from an oven without the hands of the cook coming in contact with the hot pot or pan, thus eliminating any possibility of the cooks having their hands burned or scalded in any way.

A further object of my invention is to provide a device of the above indicated character, which is quickly placed over the upper edge of a pan of any shape or design and which will firmly grip the sides of a pot or pan.

A still further object of my invention is to provide a device of the above indicated character, which will automatically release itself from the pan as soon as pressure is removed from the handles of the lifter, thus providing means whereby the tool may be quickly and easily removed from engagement with the pan after same has been removed from the oven.

Still a further object of this invention is to provide a pan lifter of the above indicated character, which is simple in construction and operation, durable, efficient for the purpose intended, and one that can be manufactured and placed on the market at a relatively low cost.

Yet still another object of the present invention is the provision of a device of the character described whose gripping portions are provided with easily replaceable, soft, resilient gripping caps so that the enamel of the upper edge of a pan or pot will not be damaged nor will the rim or edge of the pan or pot be bent or otherwise be deformed by the use of the device regardless of how strong a gripping pressure may be exerted upon the same.

With the above and numerous other objects in view as will appear as the description proceeds, the invention resides in certain novel features of construction, and in the combination and arrangement of parts as will be hereinafter more fully described and claimed.

In the drawing.

Similar numerals refer to similar parts throughout the several views.

Figure 1:
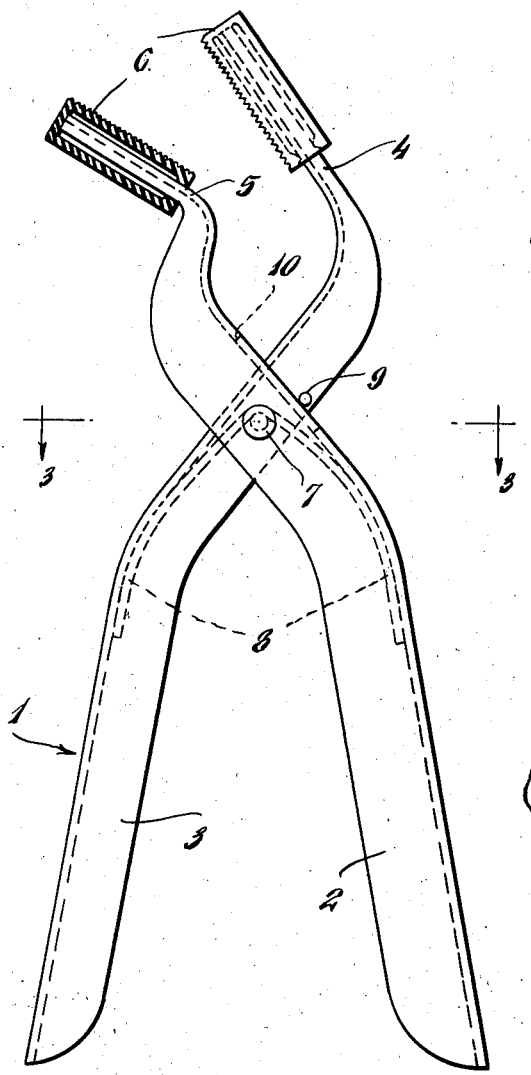
Figure 1 is a side elevation of a preferred embodiment of my invention as it appears when its gripping portions are in an open position.
Figure 2:
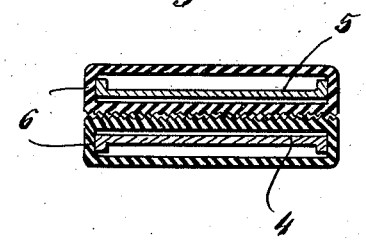
Figure 2 is a cross-sectional view through the closed gripping portions.
Figure 3:
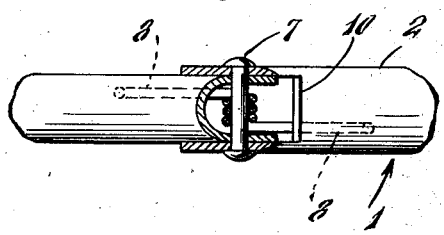
Figure 3 is a sectional view on the line 3—3 of Figure 1.

In the drawing the numeral 1 denotes a pair of pincers having handles 2 and 3 and gripping jaws 4 and 5 which work on a pivot 7. In this specification the parts of the pincers which are beyond the pivot 7 are called the "jaws 4 and 5," and the portions which extend directly from the handles 2 and 3 beyond the pivot 7 are called the "main portions of the jaws," while the straight primarily flat outer end portions which extend from said main portions are called the "gripping portions." The latter are bent relative to the adjoining main portion of the jaw member at substantially right angles, so that they will be in a substantially vertical position when the handles 2 and 3 are pressed towards one another so that said handles are in a substantially horizontal position. These gripping portions of the jaws 4 and 5 are substantially flat and have in cross-section the shape of a U which has a broad web between two low ribs, as may be seen in Fig. 2. The main portions of the jaws 4 and 5 and the handles 2 and 3 are preferably also substantially U-shaped in cross-section but have higher ribs than the gripping portions. A spring 8 (Figs. 1 and 3) is arranged around the pivot 7 and is adapted to swing the handles 2 and 3 and the jaws 4 and 5 about the pivot 7, so that the tool will be normally open and release itself from a pot or pan when no pressure is exerted upon the handles 2 and 3. The opening movement caused by spring 8 is limited by a pin 9, which is secured to part 3. That portion of handle 3 which is joined to the jaw 4 is slightly narrower than the handle 2, and is extended through an aperture 10 in the latter.

Flat caps 6 of heat resisting rubber or of any other soft suitable material are placed upon the gripping portions of the grasping jaws 4 and 5 in such a manner that they cannot slide or change their position, but that they never can stick to the gripping portions, so that they always can be removed and replaced easily when they are worn out. I prefer to carry out this feature of my invention in the manner shown in Figs. 1 and 2, where it will be seen that each cap 6 has a mouth which fits tightly around the gripping portion of a jaw, but that the main portion of the hollow interior of each cap 6 is dimensioned to fit snugly the outer sides of the ribs of the gripping portion of the jaw and to fit loosely the top and bottom of said gripping portion. Thus the tightly fitting mouth will prevent any sliding up and down of a cap on a jaw 4 or 5 when the tool is used, whereas the fact that the inside of the cap fits loosely the top and bottom of the gripping portion will prevent a sticking of the cap on the gripping portion.

Those sides of the caps 6 which are opposite to each other and which come in direct contact with the pan or pot, the so-called "gripping sides," are provided with roughages, so that even a slight pressure will be sufficient for safely grasping the pan or pot edge.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

Having thus described my invention, what I claim and desire to secure by Letters Patent in the United States is:

1. A pan lifter comprising a pair of pincers having broad U-shaped jaws and a pair of resilient flat caps covering the gripping portions of said jaws and having rough surfaces at their gripping sides, each of said caps having a mouth which fits tightly around the gripping portion of one of said grasping jaws whereas the main portion of the interior of each cap is larger than that portion of the grasping jaw which is covered by the cap, all substantially as set forth.

2. A pan lifter comprising two handles which are U-shaped in cross-section, two jaws extended from said handles, a pivot on which said handles and jaws work, resilient means on said pivot adapted to swing the handles and the jaws about the pivot, and a flat cap covering the gripping portion of each jaw and having a rough surface at its gripping side, each of said caps having a mouth which fits tightly around the gripping portion of one of said jaws whereas the interior of each cap is larger than that portion of the jaw which is covered by the cap, and the gripping portions of said jaws being primarily flat and having in cross-section the shape of a U which has a broad web between two low ribs, all substantially as described.

JOSEPH A. FINK.